(12) United States Patent
Taima

(10) Patent No.: US 7,185,289 B1
(45) Date of Patent: Feb. 27, 2007

(54) DEVICE AND METHOD FOR CHANGING LANGUAGES ON A DISPLAY

(75) Inventor: Katsuyuki Taima, Hiratsuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/500,449

(22) Filed: Feb. 9, 2000

(30) Foreign Application Priority Data

Feb. 15, 1999 (JP) .................................. 11-035719

(51) Int. Cl.
*G06F 3/00* (2006.01)

(52) U.S. Cl. ...................................................... 715/810

(58) Field of Classification Search ................ 345/703, 345/810, 835–839, 846, 847; 399/81; 704/8, 704/2; 715/810, 835, 839, 846, 847
See application file for complete search history.

(56) References Cited

U.S. PATENT DOCUMENTS

| | | | | |
|---|---|---|---|---|
| 5,694,562 A | * | 12/1997 | Fisher | 715/839 |
| 5,828,992 A | * | 10/1998 | Kusmierczyk | 345/703 |
| 5,917,484 A | * | 6/1999 | Mullaney | 345/703 |
| 6,255,630 B1 | * | 7/2001 | Barnes et al. | 219/395 |
| 6,396,515 B1 | * | 5/2002 | Hetherington et al. | 345/703 |

FOREIGN PATENT DOCUMENTS

JP     6-75732     3/1994

OTHER PUBLICATIONS

Microsoft Internet Explorer, Copyright 1995-2001.*

* cited by examiner

*Primary Examiner*—Kristine Kincaid
*Assistant Examiner*—Thanh Vu
(74) *Attorney, Agent, or Firm*—Morrison & Foerster LLP

(57) ABSTRACT

A device having a display unit for displaying a first screen for changing a display language and a second screen having an optional item for displaying a language change screen wherein the optional item is displayed in a predetermined language.

15 Claims, 14 Drawing Sheets

| JAPANESE SET | ENGLISH SET |
|---|---|
| レディ | READY |
| セッテイ | SETTING |
| ネットワーク | NETWORK |
| ポート | PORT |
| LANGUAGE | LANGUAGE |
| ヨウシ | PAPER |
| ENGLISH | ニホンゴ |
| ニホンゴ | READY |
| モドル | EXIT |
| . | . |
| . | . |
| . | . |

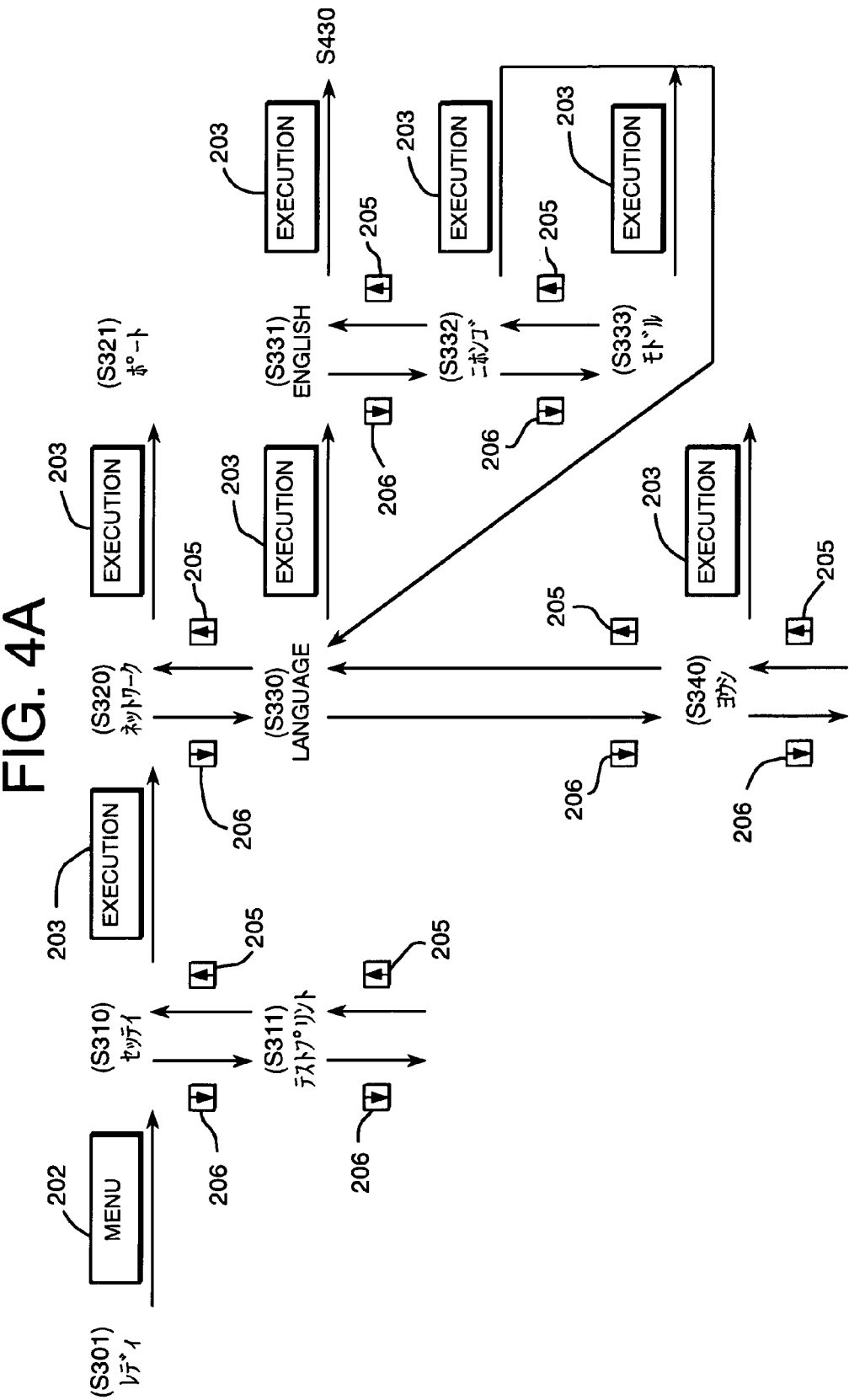

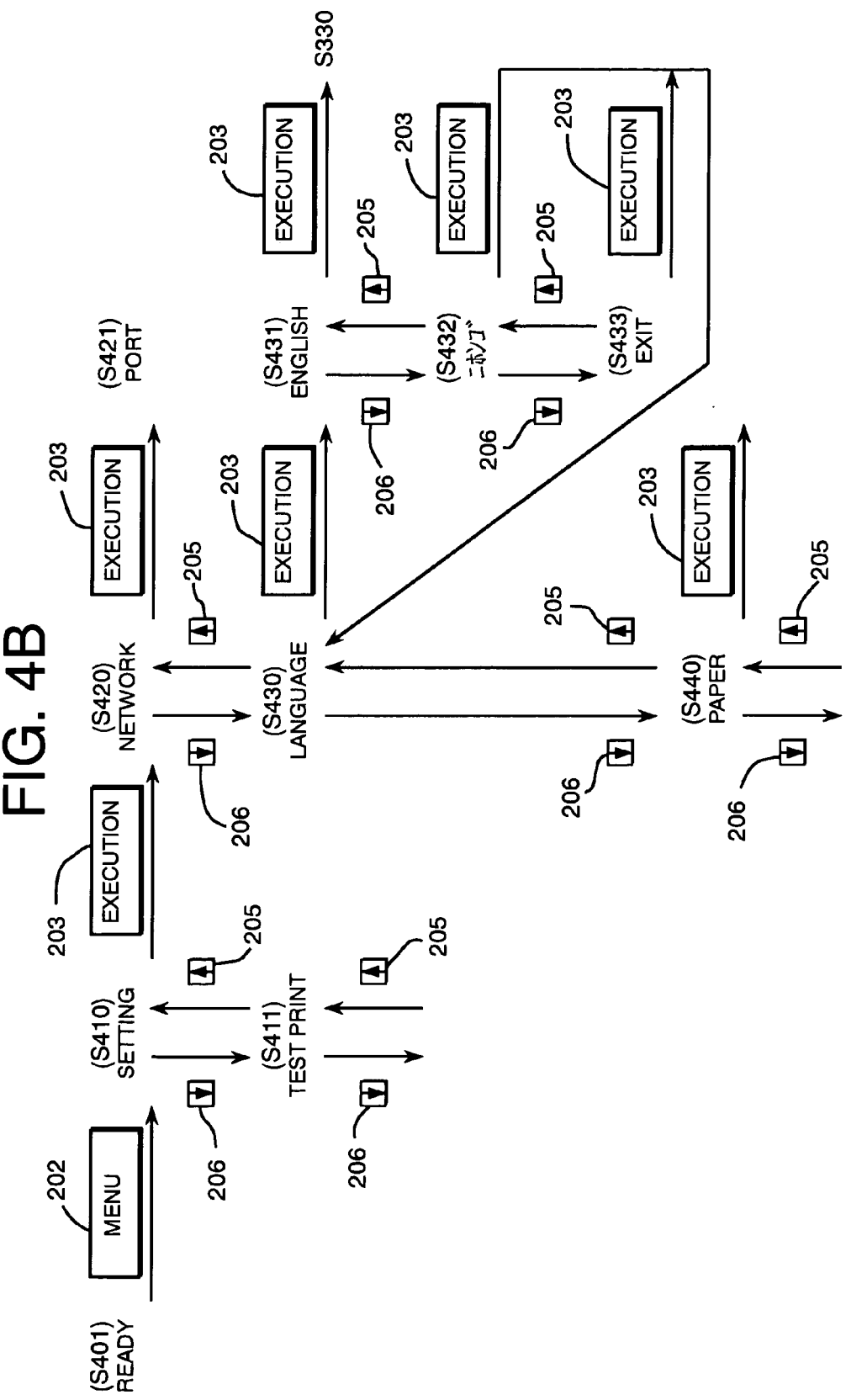

| JAPANESE SET | ENGLISH SET | GERMAN SET | FRENCH SET | SPANISH SET | ITALIAN SET | COMMON SET |
|---|---|---|---|---|---|---|
| 用紙サイズ | PAPER SIZE | · | · | · | · | LANGUAGE |
| 用紙種類 | PAPER TYPE | · | · | · | · | ENGLISH |
| 濃度 | DENSITY | · | · | · | · | JAPANESE |
| 仕上げ | FINISHING | · | · | · | · | GERMANY |
| 原稿 | ORIGINAL | · | · | · | · | FRENCH |
| 戻る | EXIT | · | · | · | · | SPANISH |
| · | · | · | · | · | · | ITALY |
| · | · | · | · | · | · | · |
| · | · | · | · | · | · | · |

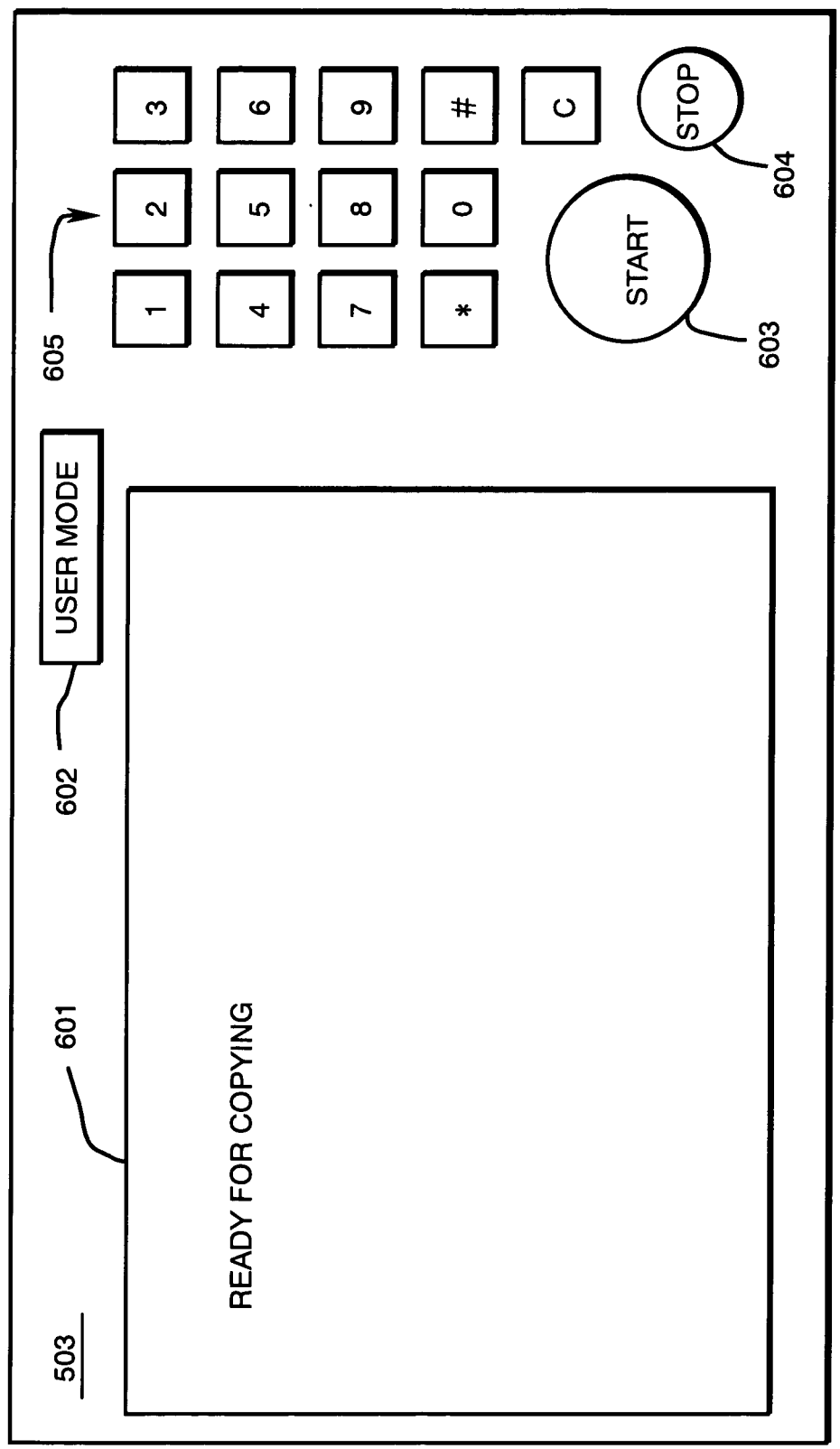

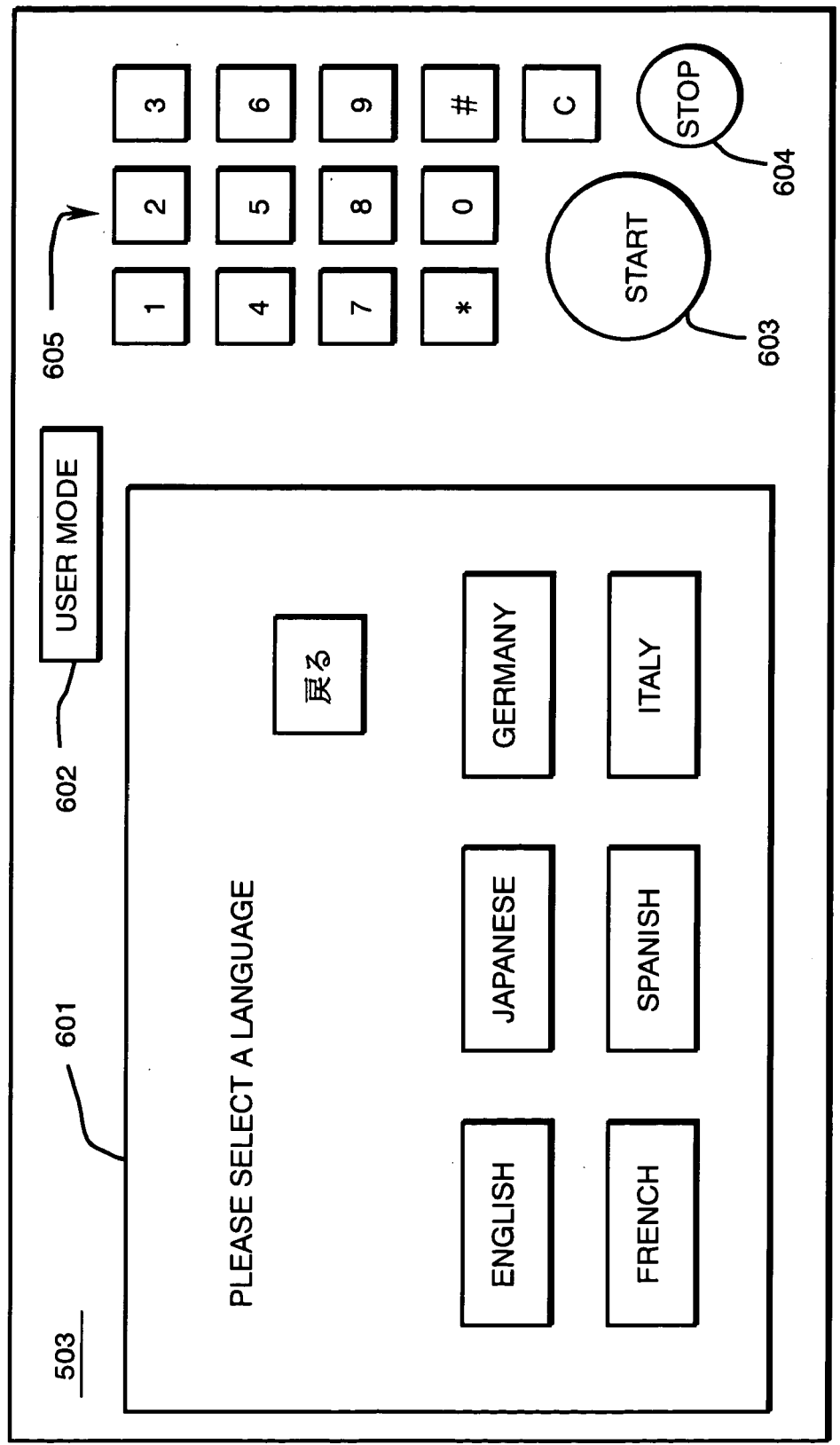

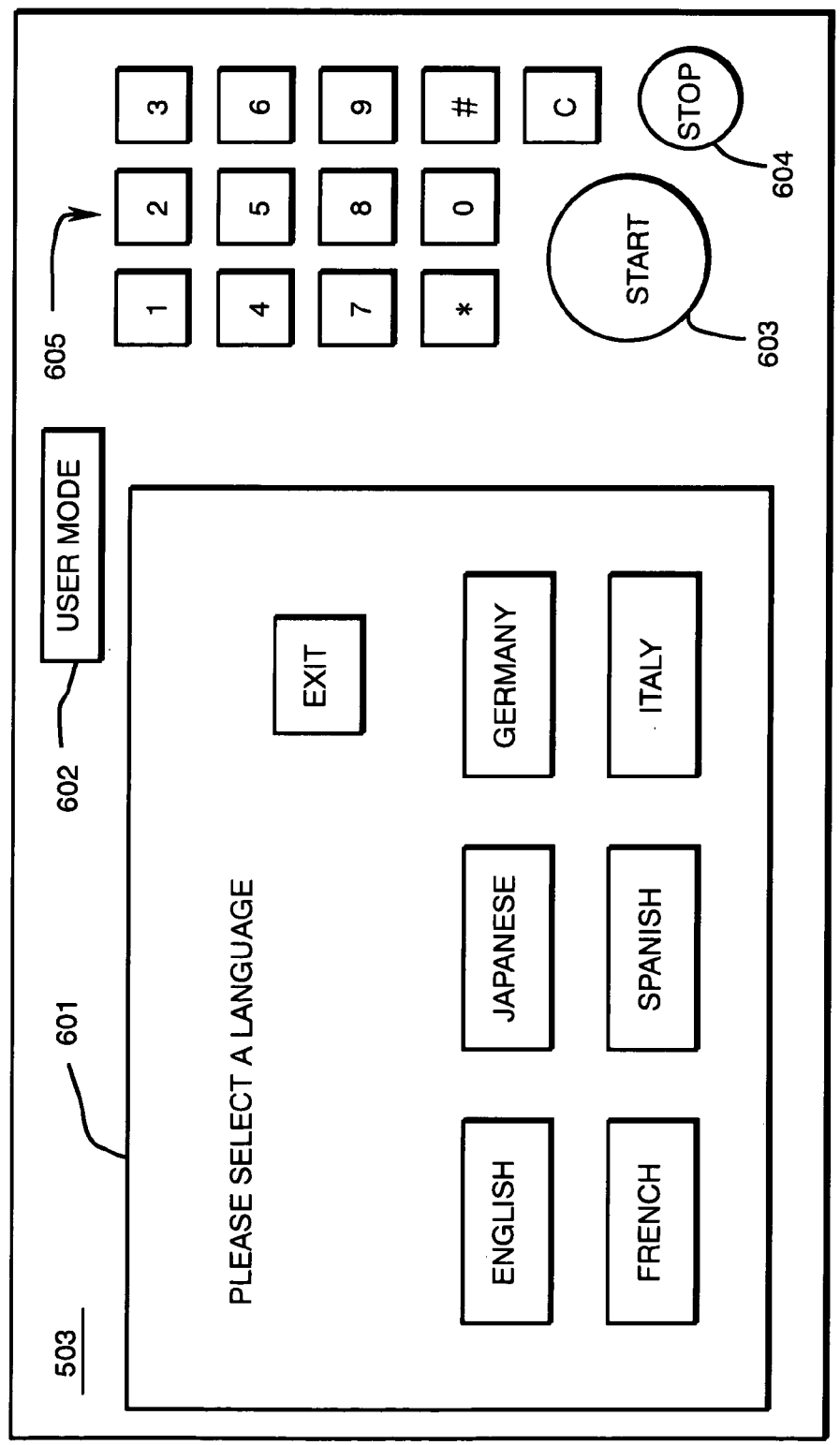

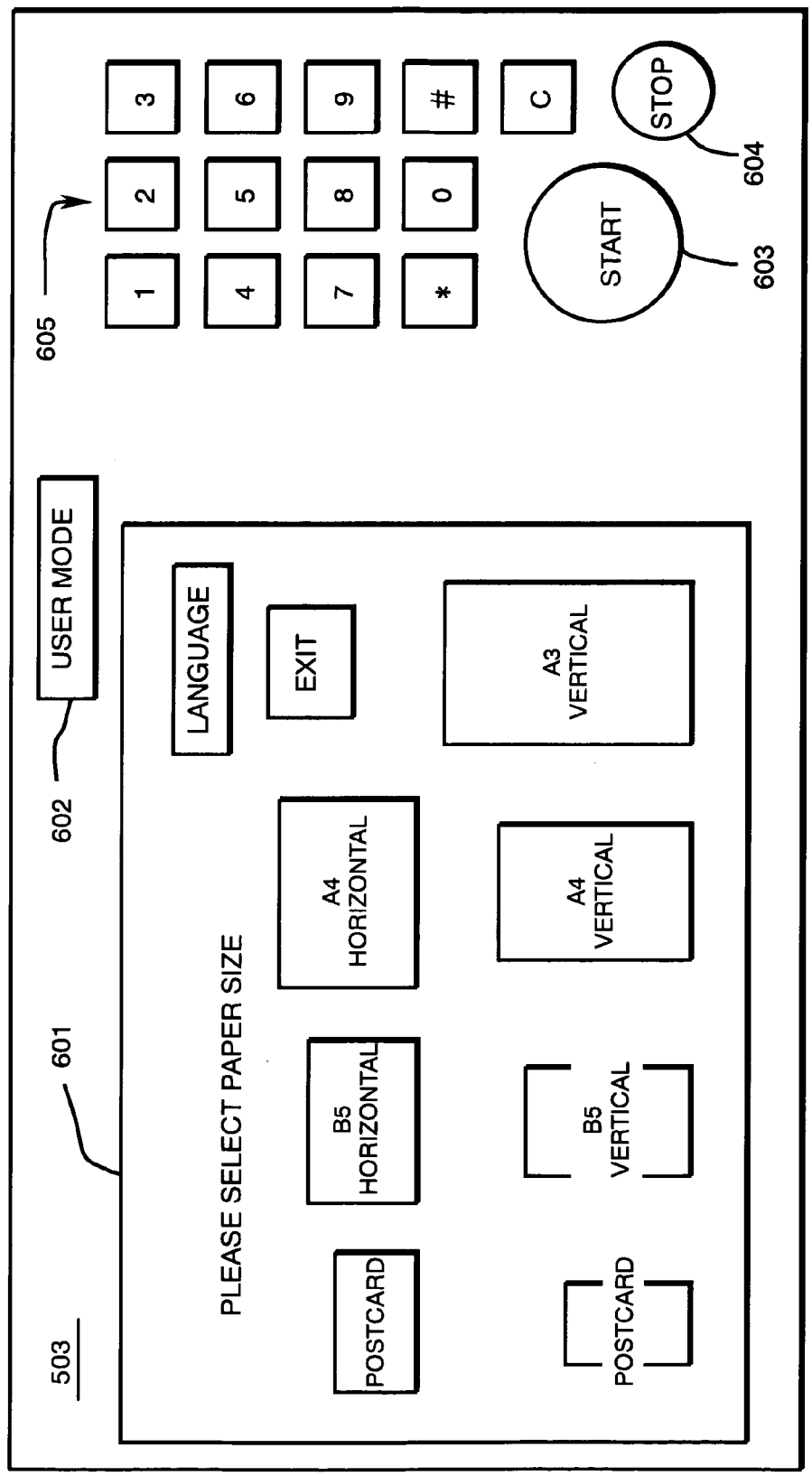

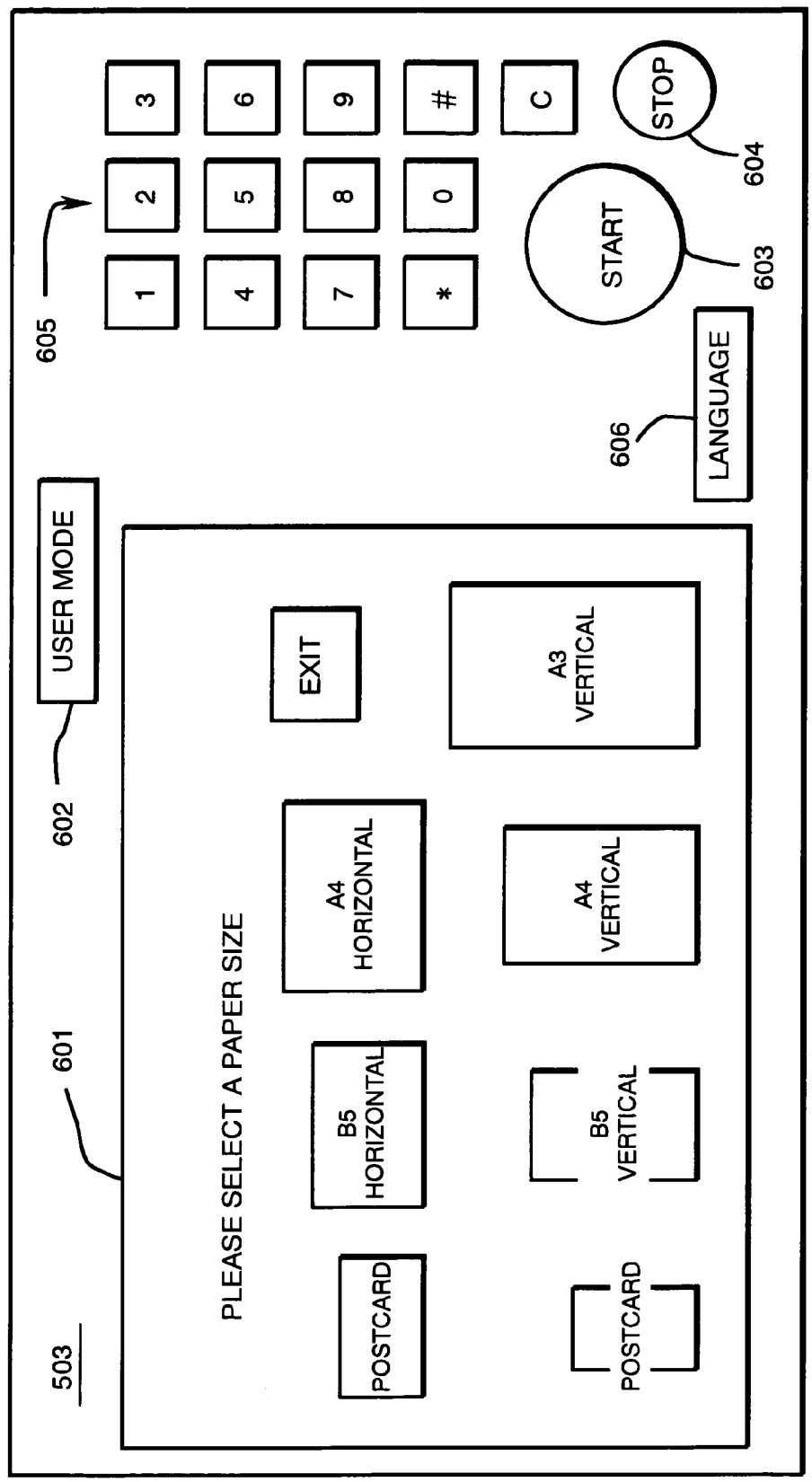

DEVICE AND METHOD FOR CHANGING LANGUAGES ON A DISPLAY

This application is based on the Japanese Patent Applications No. 11-035719 filed on Feb. 15, 1999, the contents of which are hereby incorporated by reference.

BACKGROUND OF THE INVENTION

1. Field of the Invention

The invention relates to a device and a method for arbitrarily setting up a display language from a list of a plurality of languages available for displaying various optional items.

2. Description of Related Art

Various types of display devices have been in use on various types of equipment throughout the world in recent years. These typical display devices incorporate a display unit such as a LCD (liquid crystal display) and a CRT (cathode ray tube) and are used for setting up various parameters and/or inputting operational instructions. Such devices can be divided primarily into two types, i.e., the separate type and the touch panel type.

A separate type device consists of a display unit that includes a screen where optional items are displayed and a plurality of hard keys for selecting an arbitrary item from a list of optional items displayed, which are provided independently and separate from the display unit. The display unit consists of a small LCD capable of displaying a line or up to five lines of message. The selection of a particular item is executed by pressing a hard key.

A touch panel type device consists of a display unit, which is either a LCD or CRT with a diagonal face width of 3 to 6 inches, and a touch switch consisting of a matrix of transparent electrodes arranged on the display unit. Selection of an item is executed when the user touches the screen at a particular location. More specifically, the location where the user touched is detected based on the signal from the touch switch, and the detected location is collated with the locations of various displayed items to identify the item selected by the user.

The separate type device is typically used on computer peripheral devices such as printers and scanners, or relatively small copying machines and facsimile machines. On the other hand, the touch panel type device is typically used on relatively large and/or multiple functioned copying machines and facsimile machines as well as on automatic teller machines.

In order to make these devices usable in various countries around the world, some of these devices allow the user to set up a language of the user's choice from a list of various stored languages.

For example, the Publication of Unexamined Patent Application No. JP-A-6-75732 discloses a printer equipped with a multiple language display device. The display allows the user a choice between English and Japanese as the display language. Moreover, the language change screen always displays both "English" and "NIHONNGO (ニホンゴ)" as optional items for selecting English or Japanese respectively regardless of which language is currently set up. The Japanese phrase "NIHONNGO (ニホンゴ)" means "Japanese."

However, all items on the screen which allows the user to set up the language change screen are displayed in the selected language, so that it is difficult to switch to the language change screen for a user who does not understand the language currently set up.

SUMMARY OF THE INVENTION

It is an object of the present invention to provide a device having a display unit, a first means for displaying on the display unit a first screen for changing a display language, and a second means for displaying on the display unit a second screen having an optional item for displaying a language change screen wherein the optional item is displayed in a predetermined language.

It is other object of the present invention to provide a device having a display unit, a first means for displaying on the display unit a language change screen for changing a display language, a second means for displaying on the display unit a plurality of setting screens for setting the device, and a switching means for switching from a setting screen displayed arbitrarily by the second means to the language change screen.

A further object of the invention is to provide a device including a display unit, a first means for displaying on the display unit a first screen for changing a display language, a second means for displaying on the display unit a second screen having an optional item for displaying a language change screen, a third means for displaying on the display unit a plurality of setting screens for setting the device, and a switching means for switching from a setting screen displayed arbitrarily by the third means to the second screen.

Still a further object of the invention is to provide a display device including a display means for displaying a first screen for setting a display language and a second screen having an input area for displaying the first screen, and a control means for displaying a description in a predetermined language in the input area regardless of a language currently set up.

An even further object of the invention is to provide method of display having the steps of (A) displaying a language change screen for changing a display language, (B) selecting one language as a display language from a plurality of languages using the language change screen and (C) displaying a screen in a selected language while displaying in an input area intended for displaying a first screen in a predetermined language regardless of the selected language.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 4A and FIG. 4B are flow diagrams of assistance in explaining operating flows of the control panel set up in Japanese and English respectively;

FIG. 7 is a plan view of a control panel of the copying machine;

FIG. 9A and FIG. 9B are plan views of the control panel showing language change screens set up in Japanese and English respectively;

FIG. 11A through FIG. 11C are plan views of the control panel displaying a paper selection screen, showing various modifications.

DETAILED DESCRIPTION OF THE EMBODIMENTS

The embodiments of this invention will be described below with reference to the accompanying drawings.

Embodiment 1

Figures 1, 2:
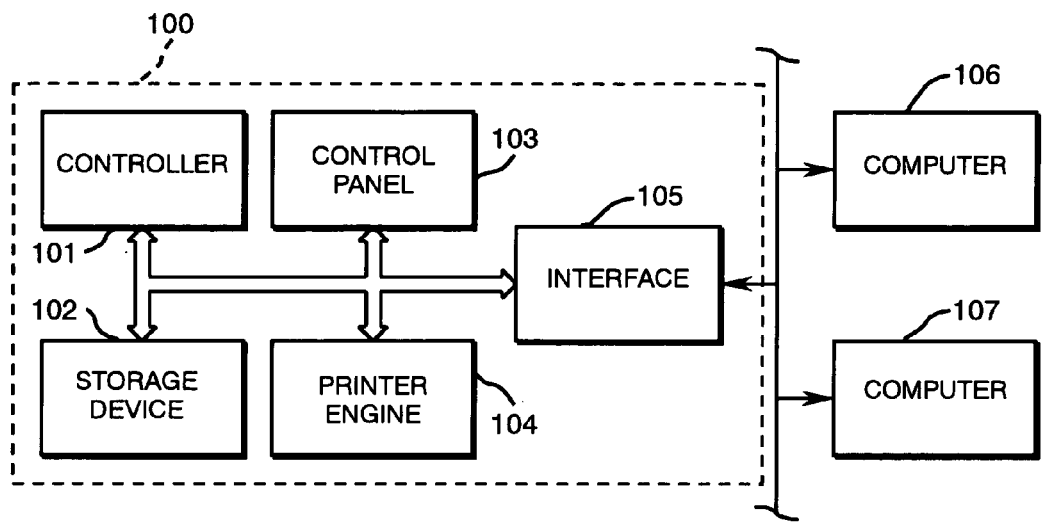
FIG. 1 is a block diagram of a printer according to the first embodiment of the present invention.
FIG. 2 shows a language table stored in the printer.

A printer 100 shown in FIG. 1 includes a controller 101, a storage device 102, a control panel 103, a printer engine 104, and an interface 105. The controller 101 controls the overall operation of the printer. The storage device 102 stores data such as programs required for the operational control of the printer and a language table. The control panel 103 is used for the input of various operational data as well as to the display of various optional items and messages. The printer engine 104 prints out the image data on the paper. The interface 105 connects the printer 100 and computers, for example, computers 106 and 107, via a network for receiving image data transmitted from the computers 106 and 107 or for transmitting the status of the printer to the computers 106 and 107. As the basic constitution and function of the printer are the same as ordinary printers, the detail descriptions are omitted.

The language table stored in the storage device 102 will be described below with reference to FIG. 2.

The language table has a plurality of sets of characters. Each character set includes data such as optional items and messages, which are generally described by means of a specific language or display language. The number of character sets to constitute the language table is not limited.

The language table shown here has a Japanese set and an English set for accommodating Japanese and English. However, it is possible to accommodate more languages by preparing more character sets such as a French set and a German set in the language table.

The display language of the optional items for switching to a language change screen is uniformly English. Thus, the optional item "LANGUAGE" for switching to the language change screen exists in the Japanese set as well. Conversely, the Japanese phrase "NIHONNGO (ニホンゴ)" that means "Japanese" exists in the English set as an optional item for selecting Japanese.

Figure 3:
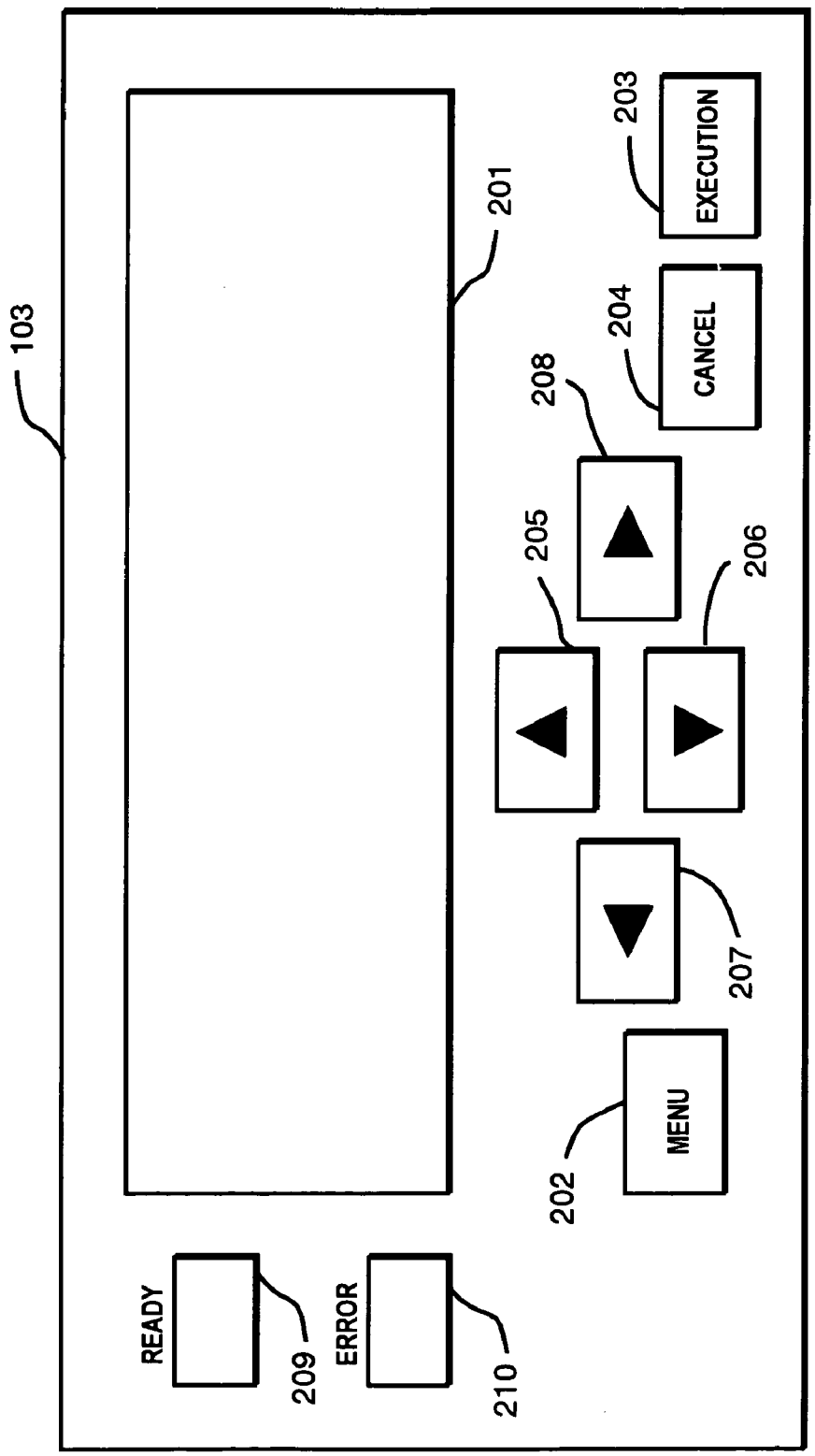
FIG. 3 is a plan view of a control panel of the printer.

Next, the constitution of the control panel 103 will be described below with reference to FIG. 3.

The control panel 103 includes an LCD (liquid crystal display) 201, a menu key 202, an execution key 203, a cancel key 204, an up key 205, a down key 206, a left key 207, a right key 208, a ready lamp 209, and an error lamp 210. The LCD 201 displays data such as various messages and optional items. The menu key 202 is used for displaying optional items to set up various functions of the printer on the LCD 201. The up key 205, the down key 206, the left key 207 and the right key 208 are used for selecting a specific item from optional items displayed on the LCD 201. The execution key 203 is used for executing the specific operation corresponding to the selected item on the printer 100. The ready lamp 209 which is an indication lamp for displaying the current status of the printer 100 indicates that it is ready for printing, or in the print ready condition. The cancel key 204 is used for restoring the printer 100 from the function setting condition to the print ready condition. The error lamp 210 is used to advise the user that an error has occurred. The control panel 103 may have other keys and indication lamps in addition to the above as needed.

Next, the basic operation of the control panel 103 will be described below.

When the printer 100 is in the print ready condition and the menu key 202 is not pressed, the ready lamp 209 lights up and "READY" is displayed on the screen of the LCD 201. As the printer 100 receives data from a connected computer, e.g., the computer 106 or the computer 107, it prints out the received data in sequence. When the paper jam or out of paper occurs, the error lamp 210 lights up and the error content is displayed as a message on the LCD 201.

On the other hand, if the printer 100 is in the print ready condition and the menu key 202 is pressed, the ready lamp 209 lights off and the printer 100 moves to the function setting condition and displays optional items for setting various settings on the LCD 201. When the cancel key 204 is pressed in the function setting condition, the printer 100 returns to the print ready condition. Data such as messages and optional items displayed on the LCD 201 will be displayed in the language currently set up.

Next, the operation for displaying optional items will be described below with reference to FIG. 4A using a case where the currently set up language is Japanese.

When the printer 100 is in the print ready condition and the menu key 202 is not pressed, the controller 101 reads "REDEI (レディ)" from the Japanese set stored in the storage device 102, and displays "REDEI (レディ)" as an optional item on the LCD 201 (Step S301). The Japanese phrase "REDEI (レディ)" means "READY"." When the menu key 202 is pressed, the controller 101 detects the key input from the control panel 103, reads "SETTEI (セッテイ)" from the Japanese set, and displays "SETTEI (セッテイ)" as an optional item on the LCD 201 (Step S310). The Japanese phrase "SETTEI (セッテイ)" means "SETTING."

If the up key 205 or the down key 206 is pressed while "SETTEI (セッテイ)" is displayed, the controller 101 changes the optional item displayed on the LCD 201 in correspondence with the pressed key. For example, "TESUTO PURINTO (トプリント)" will be read from the Japanese set and the optional item displayed on the LCD 201 will change from "SETTEI (セッテイ)" to "TESUTO PURINTO (トプリント)" (Step S311). The Japanese phrase "TESUTO PURINTO (トプリント)" means "TEST PRINT."

On the other hand, if an execution key 203 is pressed while "SETTEI (セッテイ)" is being displayed, an optional item such as "NETTO WAAKU (ネットワーク)" will be displayed in the LCD 201. The Japanese phrase "NETTO WAAKU (ネットワーク)" means "NETWORK." Moreover, if the execution key 203 is pressed while "NETTO WAAKU (ネットワーク)" is being displayed, an optional item for setting up the network such as "POOTO (ポート)" will be displayed (Step S321). The Japanese phrase "POOTO (ポート)" means "PORT."

Moreover, if the up key 205 or the down key 206 is pressed while the optional item "NETTO WAAKU (ネットワーク)" is being displayed, the optional item displayed on the LCD 201 will be switched according to the key pressed. For example, if the down key 206 is pressed, the optional item "LANGUAGE" for switching to the language change screen will be read from the Japanese set, and the optional item displayed on the LCD 201 will change from the "NETTO WAAKU (ネットワーク)" to "LANGUAGE" (Step S330). Moreover, when the down key 206 is pressed, an optional item "YOUSHI (ヨウシ)" for switching to the paper selection screen will be read from the Japanese set and the optional item displayed on the LCD 201 will change from "LANGUAGE" to "YOUSHI (ヨウシ)" (Step S340). The Japanese phrase "YOUSHI (ヨウシ)" means "PAPER." When the upper key 205 is pressed, the display will change in the reverse order of the case when the down key 206 is pressed.

The optional item "LANGUAGE" for switching to the language change screen exists in the Japanese set. In other words, the optional item for switching to the language change screen is displayed as "LANGUAGE" in English characters regardless of the character set being displayed. It is easy for a user who does not understand Japanese to switch to the language change screen.

If the execution key 203 is pressed while the optional item "LANGUAGE" is displayed, the current screen switches to the language change screen, and the optional item displayed on the LCD 201 changes from "LANGUAGE" to "ENGLISH" (Step S331). When the down key 206 is pressed, the optional item displayed on the LCD 201 changes from "ENGLISH" to "NIHONNGO (ニホンゴ)," which means Japanese (Step S332). Moreover, when the down key 206 is pressed, the optional item displayed on the LCD 201 changes from "NIHONNGO (ニホンゴ)" to "MODORU (モドル)" (Step S333). The Japanese phrase "MODORU (モドル)" which means "EXIT" is used for returning to the previous screen. Therefore, if the execution key 203 is pressed while the optional item "MODORU (モドル)" is displayed, the current screen switches to the screen containing the optional item for switching to the language change screen at Step S330, and the optional item displayed on the LCD 201 changes from "MODORU (モドル)" to "LANGUAGE." On the other hand, when the up key 205 is pressed, the display changes in the reverse order of the case when the down key 206 is pressed.

If the execution key 203 is pressed while the optional item "ENGLISH" is displayed at Step S331, the process proceeds to Step S430 shown in FIG. 4B. The controller 101 thereafter reads optional items and messages from the English set stored in the storage device 102 and displays them on the LCD 201.

Next, the operation for displaying optional items will be described below with reference to FIG. 4B using a case where the currently set display language is English. Since the operation when the display language is English is essentially the same as the operation when the display language is Japanese, the description will be brief.

When the printer 100 is in the print ready condition and the menu key 202 is not pressed, "READY" will be displayed on the LCD 201 as the optional item (Step S401). When the menu key 202 is pressed, "SETTING" will be displayed on the LCD 201 as the optional item (Step S410).

If the up key 205 or the down key 206 is pressed while the optional item "SETTING" is displayed, the controller 101 will change the optional item displayed on the LCD 201. For example, the optional item displayed on the LCD 201 changes from "SETTING" to "TEST PRINT" (Step S411).

On the other hand, if the execution key 203 is pressed while the optional item "SETTING" is displayed, another optional item such as "NETWORK" will be displayed on the LCD 201. Moreover, if the execution key 203 is pressed while the optional item "NETWORK" is displayed, an optional item for network setting, for example, "PORT," will be displayed (Step S421).

When the down key 206 is pressed while the "NETWORK" is displayed, the optional item displayed on the LCD 201 will change from the "NETWORK" to "LANGUAGE" (Step S430). Further, when the down key 206 is pressed, the optional item displayed on the LCD 201 will change from the "LANGUAGE" to "PAPER" (Step S440).

When the execution key 203 is pressed while the optional item "LANGUAGE" is displayed, the current screen switches to the language change screen, and the optional item displayed on the LCD 201 changes from "LANGUAGE" to "ENGLISH" (Step S431). Moreover, if the down key 206 is pressed, the optional item displayed on the LCD 201 changes from "ENGLISH" to "NIHONNGO (ニホンゴ)" which means Japanese (Step S432). Then, when the down key 206 is pressed, the optional item displayed on the LCD 201 changes from "NIHONNGO (ニホンゴ)" to "EXIT" (Step S433). If the execution key 203 is pressed while the optional item "EXIT" is displayed, the current screen switches to the screen containing the optional item for switching to the language change screen at Step S430 and the optional item displayed on the LCD 201 changes from "EXIT" to "LANGUAGE."

If the execution key 203 is pressed while the optional item, "NIHONNGO (ニホンゴ)," which means Japanese and phonetically corresponds to "NIHONNGO," is displayed at Step S431, the process proceeds to Step S330 as shown in FIG. 4A. From that point on, the controller 101 reads optional items and messages from the Japanese set stored in the memory 102 and displays them on the LCD 201.

Thus, the optional item for selecting Japanese displays Japanese characters even if the English set is currently set up. It is easy for a user who understands only Japanese will have no problem in selecting Japanese.

As shown in the above, the character set can be set up by pressing the execution key 203 while the optional item for selecting the display language is displayed. Data such as optional items and messages will be displayed according to the character set thus set up.

The optional item for switching to the language change screen can always be displayed in English which is the most well understood language in the world. Therefore, it is easy even for a user who does not understand the display language currently set up to switch to the language change screen. In the Embodiment 1, all the character sets include the optional item "LANGUAGE" for switching to the language change screen. However, it is also possible to have only one of the character sets to have the optional item "LANGUAGE" for all other character sets to use it.

Embodiment 2

Figures 5, 6:
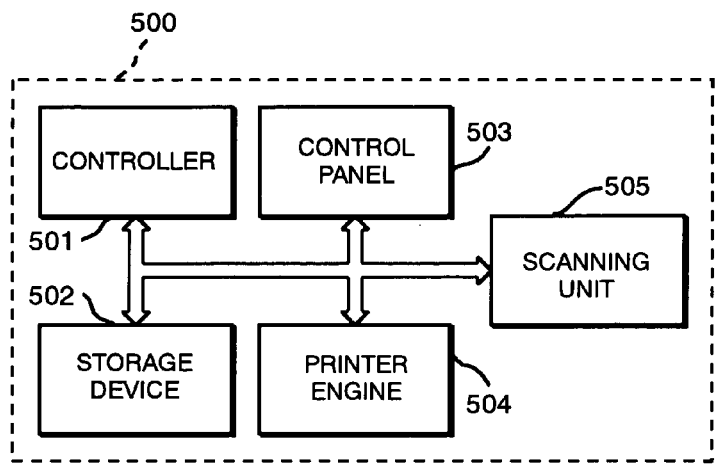
FIG. 5 is a block diagram of a copying machine according to the second embodiment of the present invention.
FIG. 6 is a language table stored in the copying machine.

The copying machine 500 shown in FIG. 5 includes a controller 501, a storage device 502, a control panel 503, a printer engine 504, and a scanning unit 505. The controller 501 controls the entire operations of the copying machine. The storage device 502 stores data such as programs that are necessary for controlling the operations of the copying machine and a language table. The control panel 503 is a touch panel type and is used for displaying optional items and messages as well as for entering operating data. The scanning unit 505 scans the image of the document. The printer engine 504 prints the image data on the paper. As the basic constitution and function of the printer are the same as ordinary printers, the detail descriptions are omitted.

Next, the language table stored in the storage device 502 will be described below with reference to FIG. 6.

The language table contains the Japanese set, English set, German set, French set, Spanish set, Italian set and a common set. The common set contains characters such as "LANGUAGE," "ENGLISH" and "JAPANESE" which are uniformly used regardless of the display language currently set up.

The constitution of the control panel 503 will be described below with reference to FIG. 7.

The control panel 503 is provided with a touch panel 601, a user mode key 602, a start key 603, a stop key 604, and a set of ten keys 605. The touch panel 601 has a liquid crystal display and touch switches consisting of transparent electrodes laminated on the liquid crystal display. The user mode key 602 is used for entering a mode for setting up various functions. The start key 603 and the stop key 604 are used for starting and temporarily stopping the copying operation, respectively. The set of ten keys 605 is used for entering numerical values.

Next, the basic operations of the copying machine will be described below.

When it is ready for using the copying functions, the touch panel 601 of the control panel 503 displays a message "READY FOR COPYING" as shown in FIG. 7. The document is placed on the scanning unit 505. The number of copies to be made is entered using the set of ten keys 605 and other functions are set up in case of need. When the start key 503 is pressed, the scanning unit 505 starts scanning the image of the document. The printer engine 504 prints the number of copies using the scanned image data.

Setting of various functions of the copying machine will be described below.

Figure 8A:
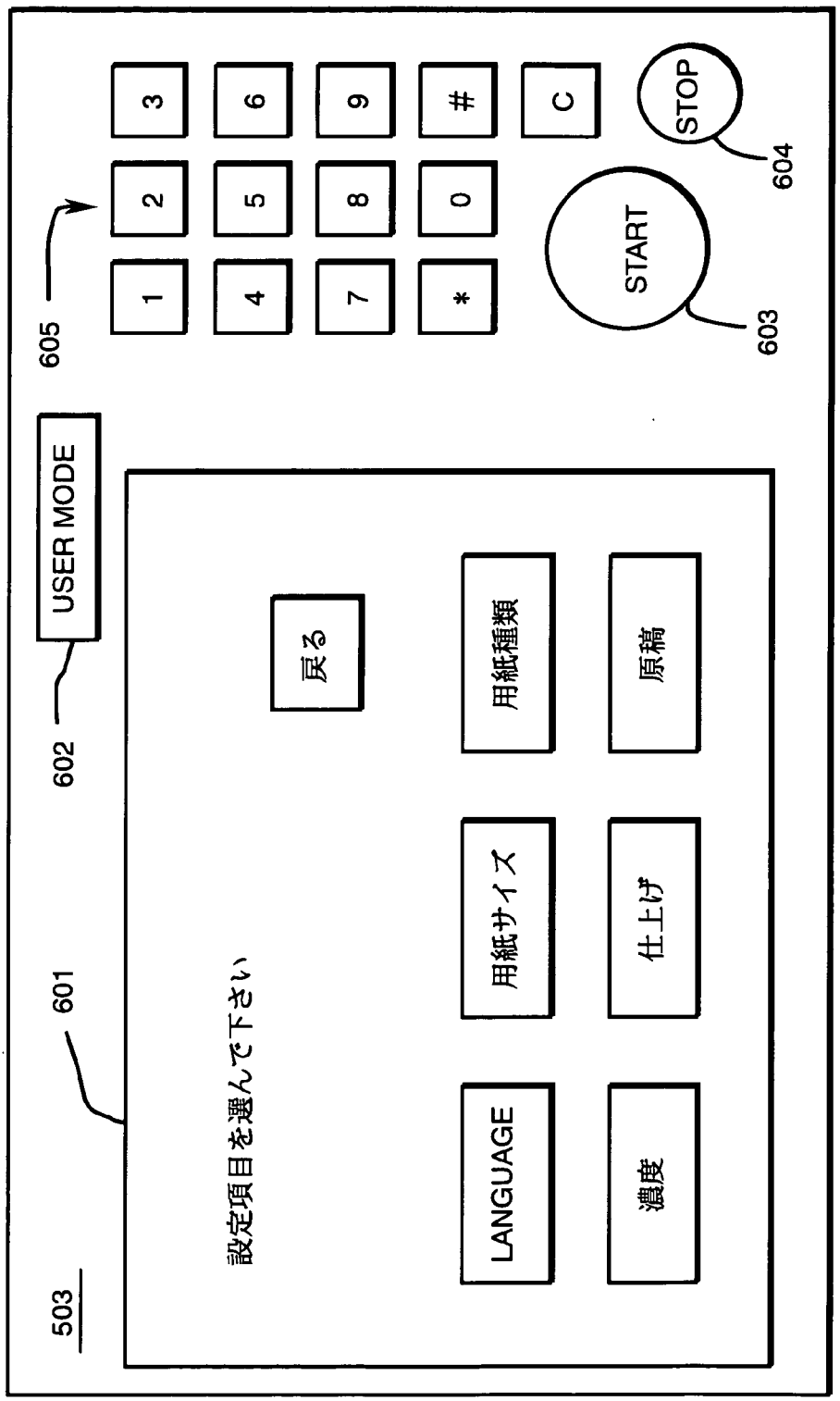
FIG. 8A and FIG. 8B are plan views of the control panel showing function setting screens set up in Japanese and English respectively.

When the controller 501 detects that the user mode key 602 on the control panel 503 is pressed, it switches the screen of the touch panel 601 to a function setting screen shown in FIG. 8A. The function setting screen shows a case where the current display language is Japanese. More specifically, the Japanese set of the language table stored in the storage device 502 is used to display "YOUSHI SAIZU (用紙サイズ)," "YOUSHI SHURUI (用紙種類)," "NOUDO (濃度)," "SHIAGE (仕上げ)," "GENKOU (原稿)" and "MODORU (戻る)" as optional items and "SETTEI KOUMOKUWO ERANDE KUDASAI (設定項目を選んで下さい)" as a message for selecting functions. The Japanese phrases "YOUSHI SAIZU (用紙サイズ)," "YOUSHI SHURUI (用紙種類)," "NOUDO (濃度)," "SHIAGE (仕上げ)," and "GENKOU (原稿)" mean "PAPER SIZE," "TYPE OF PAPER," "DENSITY," "FINISH" and "DOCUMENT," respectively. The Japanese phrase "MODORU (戻る)," which means "EXIT" is used for returning to the previous screen, languages are shown in English based on the data of the common set. However, the optional item meaning "EXIT" is displayed as "MODORU (戻る)," based on the data of the Japanese set since the display language is currently set to Japanese.

Figure 8B:
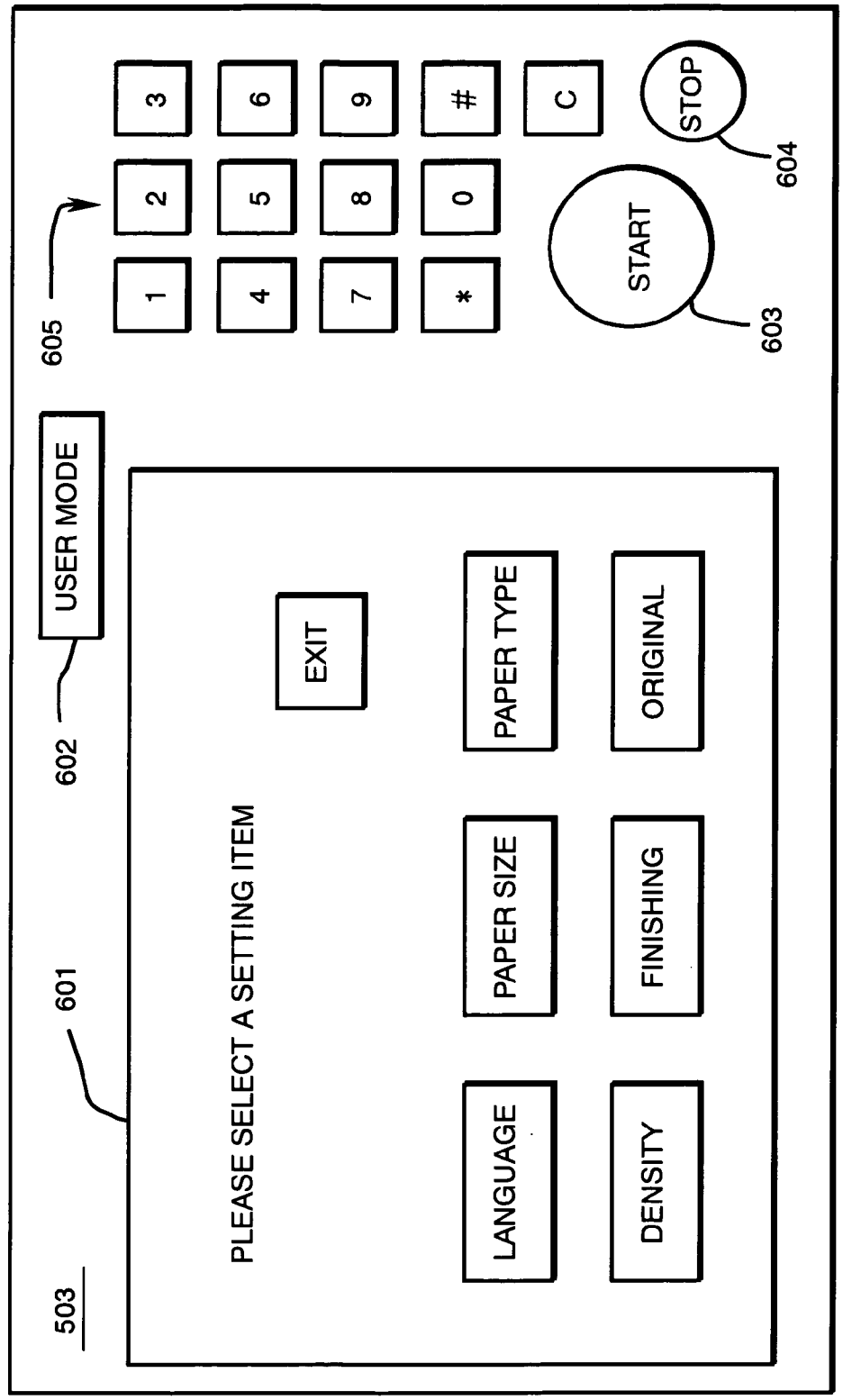

When "English" is selected, the display language is set to English, and the screen of the touch panel 601 switches from the language change screen in FIG. 9A to the function setting screen in FIG. 8B. Since the display language of the function setting screen is set up for English, all the optional items will be displayed in English. Therefore, the optional item that means "EXIT" also will be changed from Japanese to English.

When the optional item "LANGUAGE" is selected, the screen of the touch panel 601 switches from the function setting screen shown in FIG. 8B to the language change screen shown in FIG. 9B. Since the display language of the language change screen is set to English, all optional items will be displayed in English.

As shown above, in the copying machine according to the Embodiment 2 similar to the printer according to the Embodiment 1, the optional item for switching to the language change screen can be always displayed in English, which is understood by relatively more people than any other languages i.e., the function setting screen from the language change screen without changing the display language. The Japanese sentence "SETTEI KOUMOKUWO ERANDE KUDASAI (設定項目を選んで)", means "PLEASE SELECT A SETTING ITEM."

On the other hand, the optional item for switching to the language change screen is read from the common set of the language table 510 stored in the storage device 502, and "LANGUAGE" will be set up. In other words, the optional item for switching to the language change screen is displayed in English which is understood by more people compared to other languages. Consequently, even if the user does not understand the language currently set up, or Japanese, the user can easily move to the language change screen.

When the user touches the optional item "LANGUAGE" on the function setting screen, the controller 501 detects the position touched by the user by means of the signal from the touch switch. Furthermore, the controller 501 collates the obtained detection position and the position of the optional item displayed, and identifies the item touched by the user for executing the process of display screen switching. Thus, the screen of the touch panel 601 switches from the function setting screen shown in FIG. 8A to the language change screen shown in FIG. 9A.

The six optional items indicating selectable display worldwide. Therefore, even a user who does not understand the display language currently set up can easily switch to the language change screen.

It is obvious that this invention is not limited to the particular embodiments shown and described above but may be variously changed and modified without departing from the technical concept of this invention.

For example, this invention can be applied to other image forming devices such as a facsimile machine similar to the Embodiments 1 and 2.

Moreover, although it is described in the Embodiments 1 and 2 that the optional item for switching to the language change screen is to be displayed in English, it does not have to be limited to English. However, the optional item for switching to the language change screen is preferably displayed in a language that is understood by as many people as possible in the country or region where the device is used. Moreover, the optional item for switching to the language change screen can be displayed in a plurality of languages. For example, it is possible to display the optional item for switching to the language change screen as "LANGUAGE/GENGO SETTEI (言語設定)" using the Japanese phrase "GENGO SETTEI (言語設定)" which means "LANGUAGE SETTING." As a result, even a Japanese user who does not understand English can easily maneuver to switch to the language change screen.

Figure 10A:
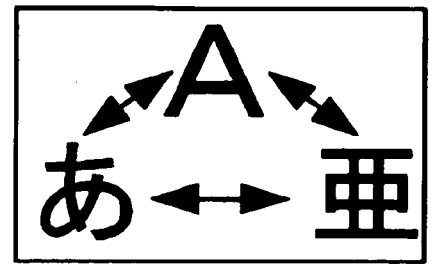
FIG. 10A through FIG. 10C are optional items for switching to the language change screens, showing various modifications.
Figure 10B:
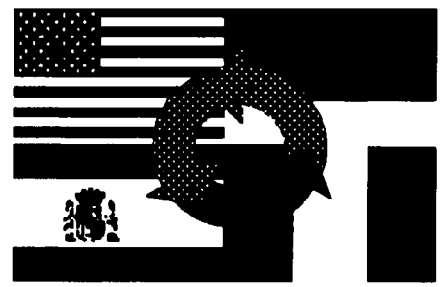
Figure 10C:
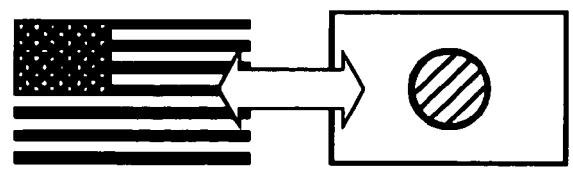

The optional item for switching to the language change screen can also be displayed using an abstract mark or symbol as shown in FIG. 10A through FIG. 10c, rather than a language. In this case, it is possible for the user to intuitionally realize how to switch to the language change screen.

In order to change the display language, it is necessary to switch to the language change screen via the function setting screen in the Embodiments 1 and 2. However, it is possible to provide the optional item for switching to the language change screen on a screen other than the function setting screen to enable to switch directly to the language change screen. For example, the optional item "LANGUAGE" can be provided on a paper selection screen as shown in FIG. 11A, which is a subordinate screen of the function setting screen. In addition, it is possible to use a symbol as shown in FIG. 10A through FIG. 10C instead of the English phrase "LANGUAGE."

The optional item "LANGUAGE" is displayed on the touch panel 601 in the Embodiments 1 and 2. However, it is possible to place the optional item "LANGUAGE" on the outside of the screen of the touch panel 601 as shown in FIG. 11B. Specifically, it is possible to provide a hard key 606, such as the set of ten keys 605 or the start key 603 according to the Embodiment 2, on the control panel 503, so that it can be used for switching to the language change screen.

Figure 11C:
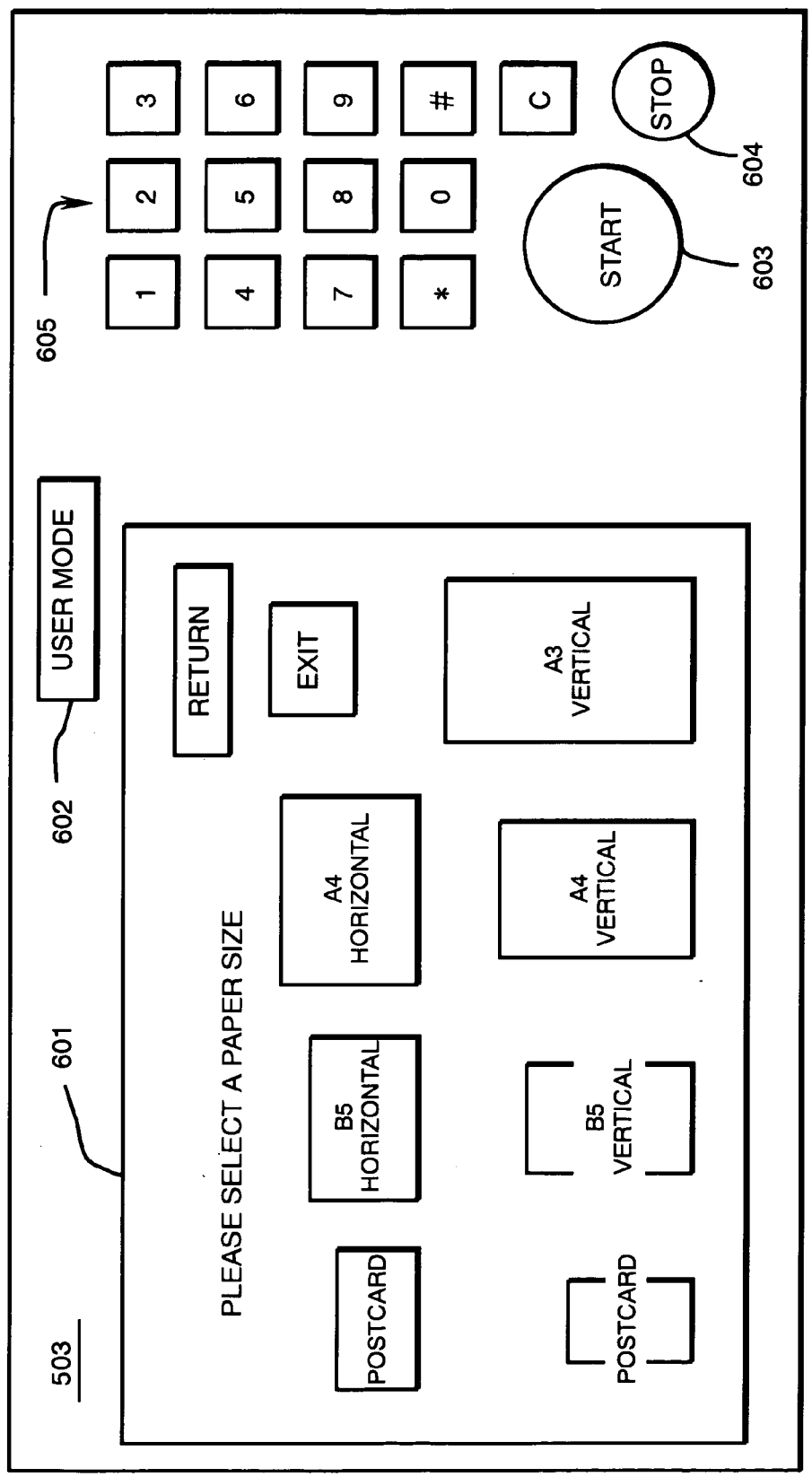

Furthermore, the opposite to the mode of switching directly from the current screen to the language change screen is applicable. Specifically, it is possible to switch the current screen to the function setting screen, which contains the optional item for switching to the language change screen, by touching the optional item "RETURN" displayed on the touch panel 601 as shown in FIG. 11C. It is also possible to provide a hard key that represents the optional item "RETURN" on the outside of the touch panel 601 on the control panel 503 for switching to the function setting screen from the current screen by pressing down the hard key.

What is claimed is:

1. A device comprising:
    a display unit;
    means for displaying a first screen on the display unit, the first screen displaying a plurality of selectable language options for selecting a display language; and
    means for displaying a second screen with an option on the display unit, the option having a same appearance regardless of the display language currently displayed, wherein the first screen is displayed when the option is designated on the second screen.

2. A device according to claim 1, wherein the option is indicated in a predetermined language regardless of the display language currently selected.

3. A device according to claim 2, wherein the predetermined language is English.

4. A device according to claim 1, wherein the option is indicated by a predetermined symbol regardless of the display language currently selected.

5. A device according to claim 1, wherein the second screen provides plural options for various device settings.

6. A display device comprising:
    a display unit which displays a first screen with a plurality of selectable language options for selecting a display language and a second screen with an option, wherein the first screen is displayed when the option is designated; and
    a control unit which controls the option to appear the same regardless of the display language currently displayed.

7. A display device according to claim 6, wherein the option is indicated in a predetermined language regardless of the display language currently selected.

8. A display device according to claim 6, wherein the option is indicated by a predetermined symbol regardless of the display language currently selected.

9. A method of display comprising:
    displaying a first screen with an option in a first display language;
    displaying a second screen when the option is designated on the first screen, the second screen displaying a plurality of selectable language options for selecting a display language;
    setting the selected language through the second screen as a second display language, the second display language being different from the first display language; and
    displaying a third screen with the option in the second display language, said option having a same appearance as in the first screen although the third screen is displayed in the second language.

10. A display device according to claim 9, wherein the option is indicated in a predetermined language regardless of the display language currently selected.

11. A display device according to claim 9, wherein the option is indicated by a predetermined symbol regardless of the display language currently selected.

12. A method for providing a display screen upon a user request, comprising:
    providing a first screen for displaying a plurality of selectable language options for selecting one of a plurality of display languages;
    providing a second screen pursuant to a selected display language, the second screen including an option for selecting the first screen, the option having a same appearance regardless of a selected display language.

13. The method as claimed in claim 12, wherein the option displayed in the second screen is represented by a predetermined symbol.

14. The method as claimed in claim 13, wherein the option displayed in the second screen is represented by a specific language regardless of the selected display language.

15. The method as claimed in 14, wherein the specific language is English.

* * * * *